(12) United States Patent
Yamaguchi

(10) Patent No.: US 8,561,638 B2
(45) Date of Patent: Oct. 22, 2013

(54) CHECK VALVE

(75) Inventor: Kosei Yamaguchi, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 321 days.

(21) Appl. No.: 12/998,768

(22) PCT Filed: Aug. 21, 2009

(86) PCT No.: PCT/JP2009/064641
§ 371 (c)(1),
(2), (4) Date: May 31, 2011

(87) PCT Pub. No.: WO2010/064475
PCT Pub. Date: Jun. 10, 2010

(65) Prior Publication Data
US 2011/0226356 A1    Sep. 22, 2011

(30) Foreign Application Priority Data
Dec. 2, 2008  (JP) ............... P. 2008-307839

(51) Int. Cl.
*F16K 24/00*  (2006.01)
(52) U.S. Cl.
USPC ................... 137/493.6; 137/493.9
(58) Field of Classification Search
USPC ............ 137/493, 493.1, 493.3, 493.6, 493.9, 137/493.4, 493.5
See application file for complete search history.

(56) References Cited

U.S. PATENT DOCUMENTS

| | | | | | |
|---|---|---|---|---|---|
| 637,994 | A | * | 11/1899 | Klay | 137/512.1 |
| 1,229,885 | A | * | 6/1917 | Chadwick | 137/493.4 |
| 2,191,636 | A | * | 2/1940 | Walker | 137/493.4 |
| 2,256,139 | A | * | 9/1941 | Craig | 62/145 |
| 3,127,907 | A | * | 4/1964 | Novak | 137/493.6 |
| 3,153,423 | A | * | 10/1964 | Biello et al. | 137/493.5 |
| 3,722,535 | A | * | 3/1973 | Raupp | 137/493.4 |
| 3,724,708 | A | * | 4/1973 | Burgess | 220/202 |
| 4,040,404 | A | * | 8/1977 | Tagawa | 123/519 |
| 4,068,680 | A | * | 1/1978 | Sliger | 137/512.1 |

(Continued)

FOREIGN PATENT DOCUMENTS

| | | |
|---|---|---|
| JP | 3-267565 A | 11/1991 |
| JP | 3421828 B2 | 4/2003 |
| JP | 2005-133875 A | 5/2005 |
| JP | 2006-329245 A | 12/2006 |

*Primary Examiner* — Stephen M Hepperle
*Assistant Examiner* — Minh Le
(74) *Attorney, Agent, or Firm* — McGinn IP Law Group, PLLC

(57) ABSTRACT

A check valve includes a main-casing, a sub-casing, a positive-pressure valve and a negative-pressure valve. The positive-pressure valve has through holes and a negative-pressure valve seat. The negative-pressure valve has leg portions. A cap is disposed within the positive-pressure valve. A positive-pressure spring is disposed between the positive-pressure valve and the sub-casing, and a negative-pressure spring is disposed between the positive-pressure valve and the cap. A positive-pressure flow path for releasing fuel vapor is formed between an outer circumference of the positive-pressure valve and an inner circumference of the main-casing, at further outward position than the positive-pressure spring. A negative-pressure flow path for introducing outside air is formed between an inner circumference of the positive-pressure valve and the leg portions and an outer circumference of the cap and between the through holes and the leg portions, at further outward position than the negative-pressure spring.

9 Claims, 10 Drawing Sheets

(56) References Cited

U.S. PATENT DOCUMENTS

| | | | |
|---|---|---|---|
| 4,378,815 A * | 4/1983 | Mochida et al. | 137/43 |
| 4,498,493 A * | 2/1985 | Harris | 137/469 |
| 4,648,369 A * | 3/1987 | Wannenwetsch | 123/467 |
| 5,090,459 A | 2/1992 | Aoki et al. | |
| 5,183,075 A * | 2/1993 | Stein | 137/493.6 |
| 6,196,258 B1 * | 3/2001 | Araki et al. | 137/493.4 |
| 6,216,729 B1 * | 4/2001 | Hambly et al. | 137/493 |
| 6,578,597 B2 * | 6/2003 | Groom et al. | 137/43 |
| 8,091,583 B2 * | 1/2012 | Olshanetsky et al. | 137/493.2 |
| 2001/0020415 A1 | 9/2001 | Osterlanger et al. | |
| 2003/0150492 A1 * | 8/2003 | Sato | 137/493.6 |
| 2004/0194828 A1 * | 10/2004 | Landhuis | 137/493.1 |
| 2005/0092364 A1 | 5/2005 | Furuya et al. | |
| 2008/0135110 A1 * | 6/2008 | Vasquez et al. | 137/493.6 |

\* cited by examiner

CHECK VALVE

TECHNICAL FIELD

The present invention relates to a check valve for regulating a pressure within a fuel tank of a motor vehicle.

BACKGROUND ART

Generally, a check valve is installed in a fuel tank of a motor vehicle. The check valve prevents the rupture of the fuel tank by releasing fuel vapor from the fuel tank when the pressure thereinside increases to a certain value or higher, and prevents the collapse of the fuel tank by introducing outside air into the fuel tank when the pressure thereinside decreases to a certain value or lower than the atmospheric pressure.

As a conventional check valve, Patent Document 1 discloses a check valve including a first body, a second body, a positive-pressure valve and a negative-pressure valve. The second body is welded to the first body integrally therewith to form a valve chamber. The positive-pressure valve is disposed within the valve chamber, and the negative-pressure valve is slidably accommodated within the positive-pressure valve. The positive-pressure valve includes a valve body in which a first valve body and a second valve body are integrally welded and a first spring disposed between the valve body and the second body. A first valve having a communication hole in an apex portion thereof is formed at an upper portion of the first valve body, so that the first valve is brought into fitting contact with a first valve seat in the first body. The first valve body is biased towards the first valve seat by the first spring. The negative-pressure valve includes a second valve disposed slidably within the valve body and a second spring disposed between the second valve and the first valve body. The second valve is biased by the second spring so as be brought into fitting contact with a second valve seat at a lower portion of the second valve body. A first passage through which vapor flows out from a tank side to an external canister side is formed between an inner wall surface of the first body and an outer circumferential surface of the first valve body and a second passage through which air flows into the tank from the external canister side is formed between an outer circumferential surface of the second valve and an inner circumferential surface of the valve body.

When the pressure within the fuel tank increases to a certain value or higher, the positive-pressure valve is pressed by fuel vapor and slides against the biasing force of the first spring to open the first valve seat, whereby the fuel vapor flows through the first passage while passing across the first spring to thereby be discharged from the fuel tank. As a result, the pressure within the fuel tank decreases. On the other hand, when the pressure within the fuel tank decreases to a certain value or lower than the atmospheric pressure, the negative-pressure valve is pressed by outside air and slides against the biasing force of the second spring to open the second valve seat, whereby the outside air flows through the second passage while passing across the second spring to thereby be flown into the fuel tank through the valve chamber and the communication hole in the first valve. As a result, the pressure within the fuel tank increases.

Patent Document 1: JP-3421828-B

DISCLOSURE OF THE INVENTION

Problem that the Invention is to Solve

In Patent Document 1, when the positive-pressure valve slides, fuel vapor flows across the first spring to be released from the tank, whereas when the negative-pressure valve slides, outside air flows across the second spring into the fuel tank. When the fuel vapor flows across the first spring and the outside air flows across the second spring, the springs tend to vibrate. Thus, the positive-pressure valve and the negative-pressure valve biased by the corresponding springs also vibrate, and abnormal noise offensive to the ears is generated from.

In addition, since the communication hole is formed in the apex portion of the first valve, when the pressure in the fuel tank increased to the certain value or higher and fuel vapor flows through an outer circumference of the positive-pressure valve, part of the flowing fuel vapor is disturbed by the communication hole, and an eddying flow is generated in an inner circumferential portion thereof. As a result, the vibration of the positive-pressure valve may be caused, and abnormal noise may be generated.

Further, since the negative-pressure valve made up of the second valve and the second spring is accommodated within the positive-pressure valve, the second valve body is welded to the first valve body after second spring is inserted into the first valve body of the positive-pressure valve while pressing the second spring through the second valve. Therefore, the assembling work becomes complex and the number of fabrication steps increases due to the welding step, and the fabrication work becomes troublesome.

Consequently, an object of the invention is to provide a check valve which can decrease operation noise when a positive-pressure valve and a negative-pressure valve slide and which can facilitate the assembling work of the positive-pressure valve and the negative-pressure valve.

Means for Solving the Problem

According to a first aspect of the invention, there is provided a check valve connected to a pipe communicating with an interior of a fuel tank, the check valve including a main-casing having a positive-pressure valve seat formed in an interior thereof, a sub-casing assembled to the main-casing so as to form a valve chamber and communicating with an outside of the fuel tank, and a positive-pressure valve and a negative-pressure valve disposed slidably in the valve chamber, wherein the positive-pressure valve is formed into a cylindrical shape, a through hole communicating with an interior thereof and a negative-pressure valve seat to and from which the negative-pressure valve is attached and detached are formed on a distal end side of the positive-pressure valve, and an outer circumference of the positive-pressure valve is attached to and detached from the positive-pressure valve seat, wherein the negative-pressure valve is disposed on an outer side of a distal end of the positive-pressure valve so as to be attached to and detached from the negative-pressure valve seat to thereby close and open the through hole and has a leg portion which is inserted into the interior of the positive-pressure valve through the through hole, wherein a cap, which is connected to the leg portion of the negative valve via a locking unit and which holds the negative-pressure slidable with respect to the positive-pressure valve, is disposed in the interior of the positive-pressure valve, wherein a positive-pressure valve spring, which biases the positive-pressure valve towards the positive-pressure valve seat in the main-casing, is disposed between the positive-pressure valve and the sub-casing, wherein a negative-pressure valve spring, which biases the negative-pressure valve towards the negative-pressure valve seat in the positive-pressure valve, is disposed between the positive-pressure valve and the cap, wherein the positive-pressure valve is detached from the positive-pressure valve seat when a pressure within the fuel tank is equal to or larger than a certain value, and the negative-pressure valve is detached from the negative-pressure valve seat when the pressure within the fuel tank decreases to a certain value or lower than the atmospheric pressure, wherein a positive-pressure flow path for allowing fuel vapor to flow out from the fuel tank when the positive-pressure valve is detached from the positive-pressure valve seat is formed so as to pass by an outer side of the positive-pressure spring between the outer circumference of the positive-pressure valve and an inner circumference of the main-casing, and wherein a negative-pressure flow path for allowing outside air to flow into the fuel tank when the negative-pressure valve is detached from the negative-pressure valve seat is formed so as to pass by an outer side of the negative-pressure spring between an inner circumference of the positive-pressure valve, and the leg portion and an outer circumference of the cap and between the through hole and the leg portion.

According to the invention, when the pressure within the fuel tank increases to the certain value or higher, the positive-pressure valve slides against the biasing force of the positive-pressure spring to be detached from the positive-pressure valve seat, and fuel vapor within the fuel tank flows through the positive-pressure flow path to be released from the fuel tank. On the other hand, when the pressure within the fuel tank decreases to the certain value or lower than the atmospheric pressure, the negative-pressure valve slides against the biasing force of the negative-pressure spring so as to be detached from the negative-pressure valve seat, whereby outside air flows into the fuel tank through the negative-pressure flow path.

Further, the positive-pressure flow path is formed so as to pass by the outer side of the positive-pressure spring and the negative-pressure flow path is also formed so as to pass by the outer side of the negative-pressure spring. Therefore, fuel vapor and outside air flow so as to avoid the corresponding springs. As a result, the vibrations or oscillations of the springs and the valves which are biased by the springs can be restrained, thereby reducing the operation noise of the valves when they slide.

Still further, the through hole is opened and closed by the negative-pressure valve and is closed when the pressure within the fuel tank is equal to or higher than the certain value. Therefore, when fuel vapor flows out from the fuel tank through the positive-pressure flow path, the flowing fuel vapor can be prevented from being disturbed on the inner circumference of the through hole so that an eddying flow is not generated. Thus, the vibration of the positive-pressure valve is restrained, thereby suppressing the generation of abnormal noise.

Still further, the negative-pressure valve can be held slidably relative to the positive-pressure valve by simply connecting the leg portion of the negative-pressure valve to the cap via the locking unit. Therefore, the step of welding the second valve after the negative-pressure valve is accommodated within the first valve body does not have to be involved unlike to Patent Document 1, thereby simplifying the fabrication process.

According to a second aspect of the invention, based on the first aspect, there is provided the check valve, wherein an opening portion communicating with the outside of the fuel tank is formed in an interior of the sub-casing, wherein a plurality of spring support ribs are provided so as to extend from a circumferential edge of the opening portion, outer circumferences of the spring support ribs constituting bearing seats for supporting one end of the positive-pressure spring, and wherein intervals between the spring support ribs communicate with the positive-pressure flow path to constitute flow paths which allow fuel vapor to flow out from the fuel tank.

According to the invention, the one end of the positive-pressure spring is supported by the plural spring support ribs, whereby the positive-pressure spring can be supported with a stable posture.

According to a third aspect of the invention, based on the second aspect, there is provided the check valve, wherein outer circumferences of the flow paths provided in the intervals between the spring support ribs each have a tapered surface which expands gradually diametrically as it extends towards the valve chamber.

According to the invention, the outer circumferences of the flow paths provided in the intervals between the plural spring support ribs each have the tapered surface which expands gradually diametrically as it extends towards the valve chamber. Therefore, the flow resistance can be reduced which is generated when the positive-pressure valve seat is opened to allow fuel vapor to pass through the positive pressure flow path to be released from the fuel tank. As a result, the fuel vapor smoothly flows out from the fuel tank, and the vibration of the positive-pressure valve can be restrained effectively.

According to a fourth aspect of the invention, based on any of the first to third aspects, there is provided the check valve, wherein an outer circumferential shape of the positive-pressure valve and an outer circumferential shape of the negative-pressure valve which is disposed on the outer side of the distal end of the positive-pressure valve have a streamlined shape which extends from the main-casing towards the sub-casing.

According to the invention, the positive-pressure valve and the negative-pressure valve have the streamlined shape. Therefore, when the positive-pressure valve is opened to allow fuel vapor to flow through the positive-pressure flow path, the flow resistance can be reduced so that the fuel vapor smoothly flows, thereby restraining the vibration of the positive-pressure valve and the negative-pressure valve effectively. Further, the valve can be made smaller in size in whole to realize a reduction in weight, thereby enabling the positive-pressure valve and the negative-pressure valve to slide more smoothly.

According to a fifth aspect of the invention, based on any of the first to fourth aspects, there is provided the check valve, wherein an outer circumference of the cap has a projecting surface which projects towards the sub-casing.

According to the invention, when the negative-pressure valve is opened and outside air flows through the negative-pressure flow path, a flow resistance is reduced to allow the outside air to flow through the negative-pressure flow path smoothly. Therefore, the vibration of the negative-pressure valve can be restrained effectively.

According to a sixth aspect of the invention, based on any of the first to fifth aspects, there is provided the check valve, wherein a spring support portion is formed on an inner circumference of the positive-pressure valve, and wherein the positive-pressure spring is disposed in an inner circumference of the positive-pressure valve with the one end of the positive-pressure spring supported by the spring support portion.

According to the invention, the one end of the positive-pressure valve is disposed in the inner circumference of the positive-pressure valve while being supported by the spring support portion on the inner circumference of the positive-pressure valve. Therefore, when fuel vapor passes through the positive-pressure flow path, the fuel vapor bypasses the positive-pressure spring in an ensured fashion without passing across the positive-pressure spring. In addition, the one end of the positive-pressure valve pressing the positive-pressure valve is positioned to lie close to the center of gravity of the positive-pressure valve and is also positioned to lie close to the positive-pressure valve seat. Therefore, the positive-pressure can be opened with a stable posture, thereby reducing the operation noise of the positive-pressure valve when it slides.

According to a seventh aspect of the invention, based on any of the first to sixth aspects, there is provided the check valve, wherein the cap has a bottomed cylindrical shape, and wherein one end of the negative-pressure side is inserted into an interior thereof so as to be supported on a bottom surface of the cap.

According to the invention, the one end of the negative-pressure spring is inserted into the cylindrical portion of the cap. Therefore, when outside air passes through the negative-pressure flow path, the outside air is allowed to bypass the negative-pressure spring in an ensured fashion without passing across the negative-pressure spring.

According to an eighth aspect of the invention, based on any of the first to seventh aspects, there is provided the check valve, wherein an inner circumferential surface of the main-casing which lies closer to a fuel tank side than the positive-pressure valve seat has a tapered surface which expands gradually diametrically as it extends towards an opening portion on a side facing the sub-casing.

According to the invention, when the positive-pressure valve is opened and fuel vapor flows out from the fuel tank and the negative-pressure valve is opened and outside air flows into the fuel tank, the flow resistance can be reduced so that the fuel vapor and the outside air smoothly flow.

According to a ninth aspect of the invention, based on any of the first to eighth aspects, there is provided the check valve, wherein the positive-pressure valve seat of the main-casing is made up of an annular rib which projects towards the sub-casing via a gap from an inner circumference of the main-casing.

According to the invention, the positive-pressure valve seat is made up of the annular rib which is formed via the gap from the inner circumferential surface, whereby the positive-pressure valve seat can be made constant in thickness while being prevented from being made thicker locally. Therefore, a defect such as a surface sink can be prevented from being generated during injection molding, thereby increasing the surface accuracy of a seal surface of the positive-pressure valve seat.

Advantage of the Invention

According to the invention, the positive-pressure flow path is formed so as to pass by the outer side of the positive-pressure spring, and the negative-pressure flow path is also formed so as to pass by the outer side of the negative-pressure spring. Therefore, fuel vapor and outside air flow by the corresponding springs, whereby the vibrations or oscillations of the springs and the valves which are biased by the springs can be restrained, thereby reducing the operation noise generated when the valves slide.

Further, the through hole is opened and closed by the negative-pressure valve and is closed when the pressure within the fuel tank is equal to or higher than the certain value. Therefore, the flow of fuel vapor is prevented from being disturbed in the inner circumference of the through hole to generate an eddying flow when fuel vapor is released from the fuel tank through the negative-pressure flow path, thereby reducing abnormal noise by restraining the vibration of the positive-pressure valve.

Still further, the negative-pressure valve can be held slidably relative to the positive-pressure valve by simply connecting the leg portion of the negative-pressure valve to the cap via the locking unit, thereby simplifying the fabrication process.

BRIEF DESCRIPTION OF THE DRAWINGS

FIGS. 5A and 5B show a positive-pressure valve making up the check valve, of which FIG. 5A is a plan view of the positive-pressure valve and FIG. 5B is a perspective view thereof as seen from obliquely therebelow.

DESCRIPTION OF REFERENCE NUMERALS AND CHARACTERS

Figure 1:
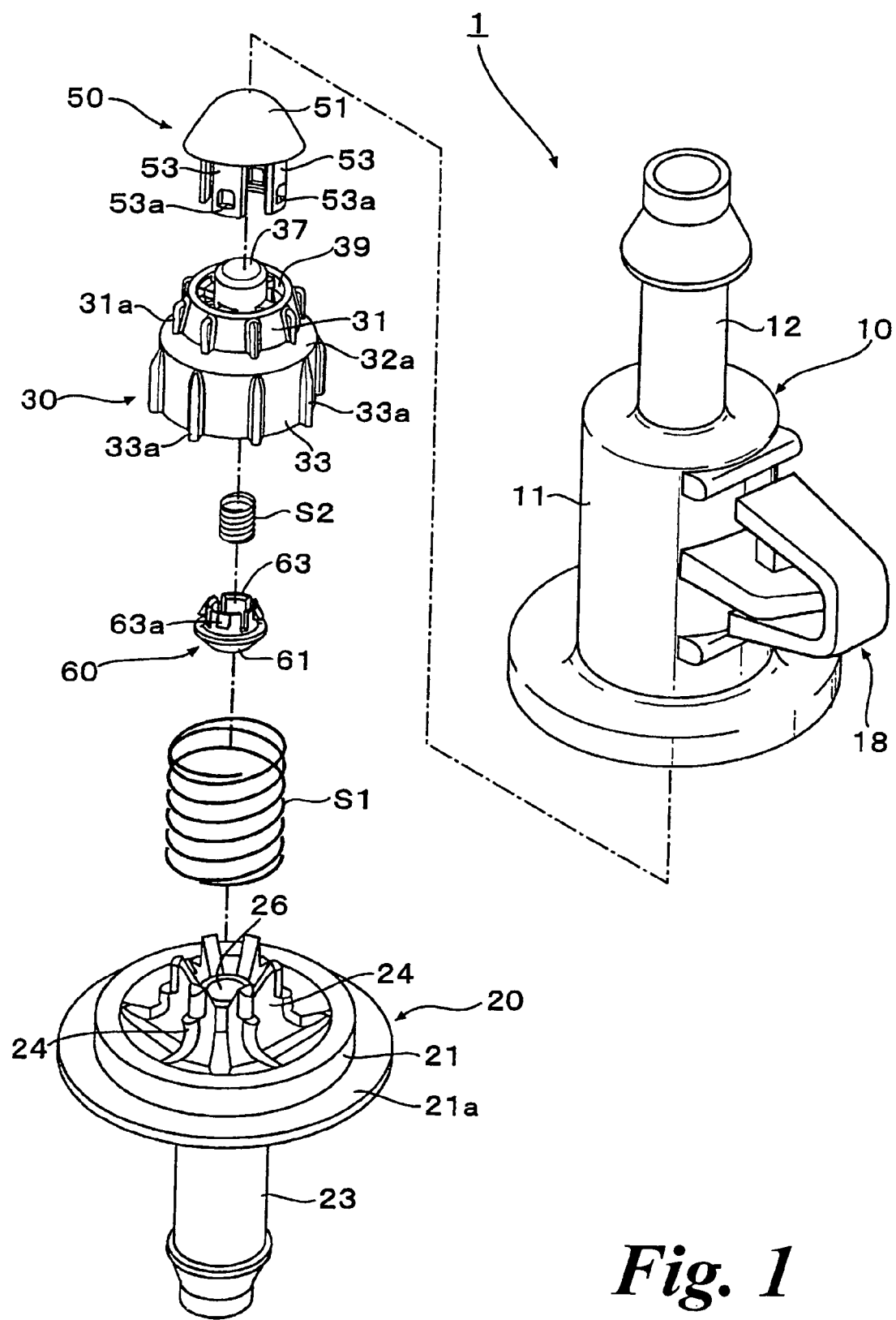
FIG. 1 is an exploded perspective view of a check valve of the invention.

1 Check valve; 10 Main-casing; 15a Positive-pressure valve seat; 15b Tapered surface; 16 Gap; 20 Sub-casing; 22 Opening portion; 24 Spring support rib; 24a Bearing seat; 25 Interval; Positive-pressure valve; 32a Outer circumference; 34 Positive-pressure spring support portion (Spring support portion); 36 Opening portion; 36a Negative-pressure valve seat; 39 Through hole; 50 Negative-pressure valve; 53 Leg portion; 60 Cap; R1 Positive-pressure flow path; R2 Negative-pressure flow path; S1 Positive-pressure spring; S2 Negative-pressure spring; V Valve chamber.

MODE FOR CARRYING OUT THE INVENTION

Hereinafter, referring to the drawings, an embodiment of a check valve of the invention will be described.

Figure 2:
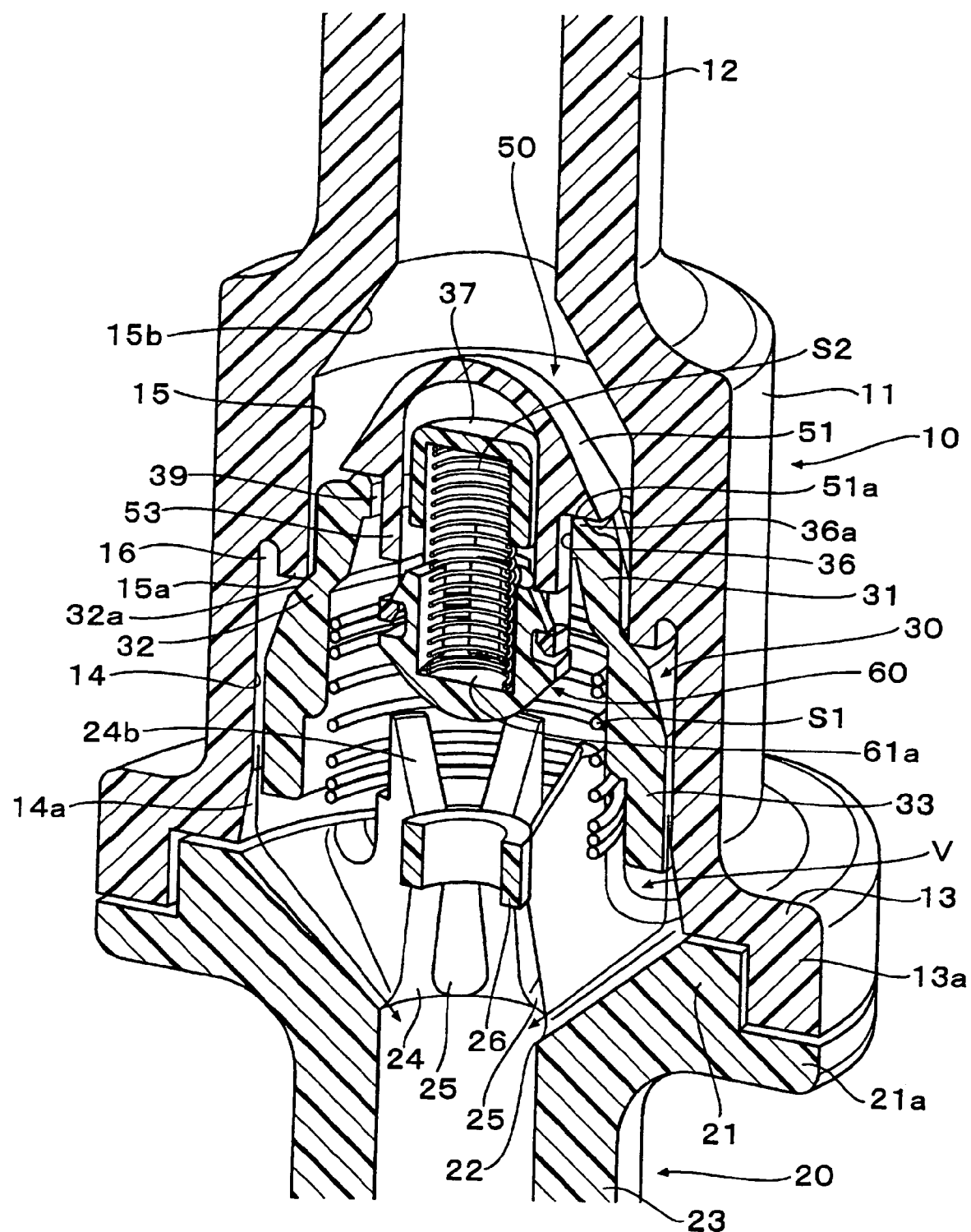
FIG. 2 is an enlarged sectional perspective view of a main part of the check valve.

The check valve 1 shown in FIGS. 1, 2 prevents the rupture of a fuel tank by releasing fuel vapor from the fuel tank when a pressure thereinside increases to a certain value or higher (a positive pressure), and prevents the collapse of the fuel tank by introducing outside air into the fuel tank when the pressure thereinside decreases to a certain value or lower than the atmospheric pressure (a negative pressure state). This check valve 1 includes a main-casing 10 which is connected to a pipe communicating with an interior of the fuel tank and which has a positive-pressure valve seat 15a formed thereinside, a sub-casing 20 which is assembled to the main-casing 10 so as to form a valve chamber V and which communicates with the outside of the fuel tank, and a positive-pressure valve 30 and a negative-pressure valve 50 which are disposed slidably in the valve chamber V.

Figure 3:
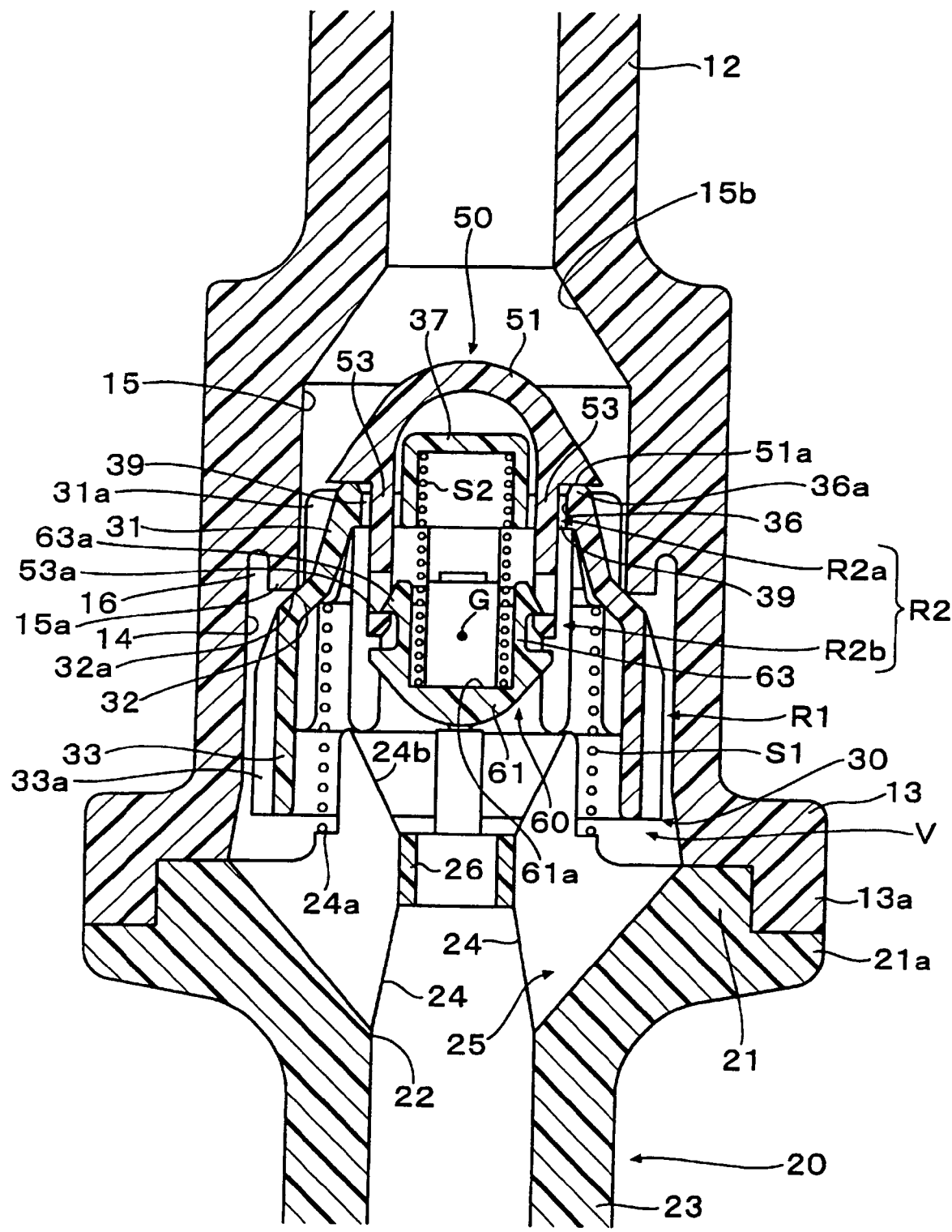
FIG. 3 is an enlarged sectional view of the main part of the check valve.
Figure 4:
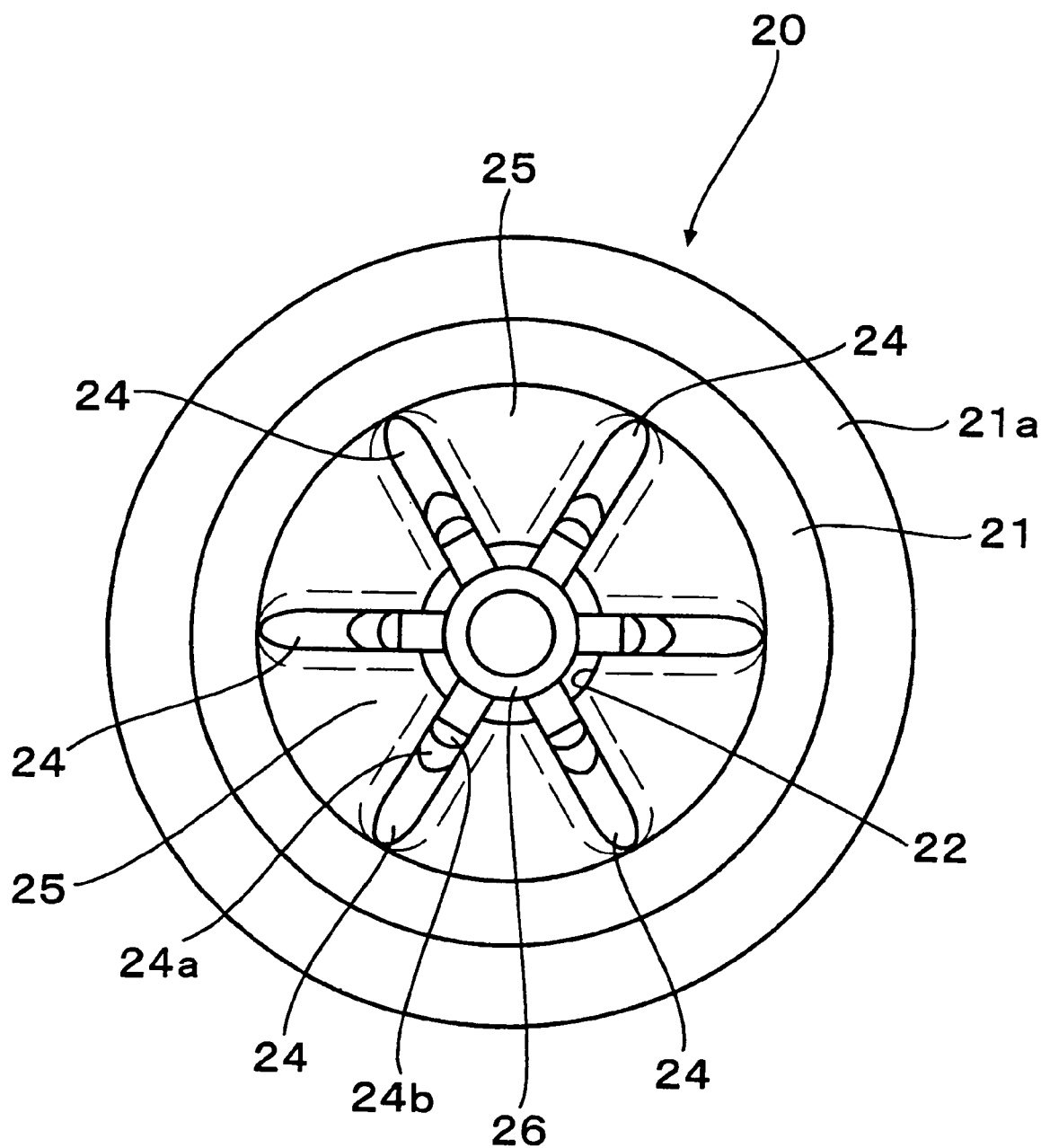
FIG. 4 is a plan view of a sub-casing making up the check valve.

Referring to FIGS. 1 to 3, the main-casing 10 will be described. This main-casing 10 has a cylindrical member 11 having a circular cylindrical shape and a connection pipe 12 integrally extending from one end of the cylindrical member 11, while the sub-casing 20 is assembled into an opening portion at the other end thereof. An interior of the connection pipe 12 communicates with an interior of the cylindrical member 11. To an outer circumference of the connection pipe 12, a pipe communicating with the interior of the fuel tank is connected. An annular flange portion 13 (refer to FIG. 2) projects from an outer circumference of the opening portion at the other end of the cylindrical member 11, and an annular fitting wall 13a projects towards the sub-casing 20 from an outer circumferential edge of the flange portion 13.

The cylindrical member 11 is made into a diametrically expanded inner circumferential portion 14 on a side facing the opening portion at the other end thereof and is made into a diametrically constricted inner circumferential portion 15 on a side facing the connection pipe 12 at one end thereof. The diametrically constricted inner circumferential portion 15 communicates with the interior of the fuel tank via the connection pipe 12. A positive-pressure valve seat 15a projects in an annular rib-like fashion from a circumferential edge of the diametrically constricted inner circumferential portion 15 towards the side of the sub-casing 20 via a gap 16 from the diametrically expanded inner circumferential portion 14. A tapered outer circumference 32a of the positive-pressure valve 30 is to be attached to and detached from the positive-pressure valve seat 15a.

In addition, an inner circumferential surface of the diametrically constricted inner circumferential surface portion 15 which lies closer to the side of the fuel tank than the positive-pressure valve seat 15a (an inner circumferential surface on a side thereof which faces the connection pipe 12) is made into a tapered surface 15b which expands gradually diametrically as it extends towards the sub-casing 20. Further, an inner circumferential surface of the diametrically expanded inner circumferential portion 14 which faces the sub-casing 20 is also made into a tapered surface 14a which expands gradually diametrically as it extends towards the side of the sub-casing 20.

In this embodiment, a clip 18 (refer to FIG. 1) is formed on an outer circumferential surface of the main-casing 10 in order to install the check valve 1 at a certain location within the fuel tank.

Next, referring to FIGS. 1 to 4, the sub-casing 20 which is installed in the main-casing 10 so as to form a valve chamber V thereinside will be described. This sub-casing 20 has a disk-shaped lid portion 21 which is assembled to the opening portion at the other end of the main-casing 10 and which has an opening portion 22 communicating with the outside of the fuel tank at the inside center of the lid portion 21 and a connection pipe 23 extending from a circumferential edge of the opening portion 22. To an outer circumference of the connection pipe 23, an exterior pipe, which is connected to a canister disposed outside the fuel tank, is connected.

The disk-shaped lid portion 21 is fitted in an inner circumference of the fitting wall 13a of the main-casing 10 so as to be joined thereto by welding, bonding or the like. An annular flange portion 21a is formed on an outer circumference of a proximal end of the lid portion 21, so as to be brought into abutment with the flange portion 13 of the main-casing 10.

In addition, as shown in FIGS. 2, 3, an inner circumferential surface of the opening portion 22 is formed into a substantially mortar shape and is hence made into a tapered surface which expands gradually diametrically towards the side of the valve chamber V from a side thereof which lies to face the connection pipe 23. Plural spring support ribs 24 are projected from the inner circumferential surface of the opening portion 22 at certain uniform intervals in a circumferential direction towards the positive-pressure valve 30 which is accommodated and held in the valve chamber V. The intervals 25 communicate with a positive-pressure flow path R1 (refer to FIG. 3) and constitute flow paths which allow fuel vapor to be released from the fuel tank.

A step-shaped bearing seat 24a is formed on an outer circumference of each spring support rib 24 to support one end of a positive-pressure spring S1. As shown in FIG. 2, a tapered portion 24b is formed on an inner circumference of a distal end of each spring support rib 24 so that its height increases gradually towards the side of the opening portion 22. An annular ring 26 (refer to FIGS. 2, 4), which communicates with the valve chamber V and the opening portion 22, is disposed at proximal end sides of the tapered portions 24b and inside the plural spring support ribs 24 and is connected to the spring support ribs 24.

Next, the constructions of the positive-pressure valve 30 and the negative-pressure valve 50 will be described which are disposed to be accommodated slidably in the valve chamber V defined by the main-casing 10 and the sub-casing 20.

Firstly, referring to FIGS. 1 to 3, 5A to 7 and 9, 10, the positive-pressure valve 30 will be described. this positive-pressure valve 30 has a small-diameter cylindrical portion 31 which is disposed at a distal end side and a large-diameter cylindrical portion 33 which is diametrically expanded wider than the small-diameter cylindrical portion 31 and which is connected to a proximal end of the small-diameter cylindrical portion 31 via a connecting portion and has a cylindrical shape made up of the two concentric cylindrical portions having different outside diameters.

In this positive-pressure valve 30, the small-diameter cylindrical portion 31 lying at the distal end side is disposed to be accommodated within the diametrically constricted inner circumferential portion 15 of the main-casing 10, while the large-diameter cylindrical portion 33 at the proximal end side is disposed to be accommodated within the diametrically expanded inner circumferential portion 14 of the main-casing 10. In addition, the positive-pressure flow path R1 (refer to FIGS. 3, 9) is formed between an outer circumference of the large-diameter cylindrical portion 33 of the positive-pressure valve 30 and an inner circumference of the diametrically expanded inner circumferential portion 1 of the main-casing 10 so as to allow fuel vapor to flow out from the fuel tank when the positive-pressure valve 30 is detached from the positive-pressure valve seat 15a.

Figure 5A:
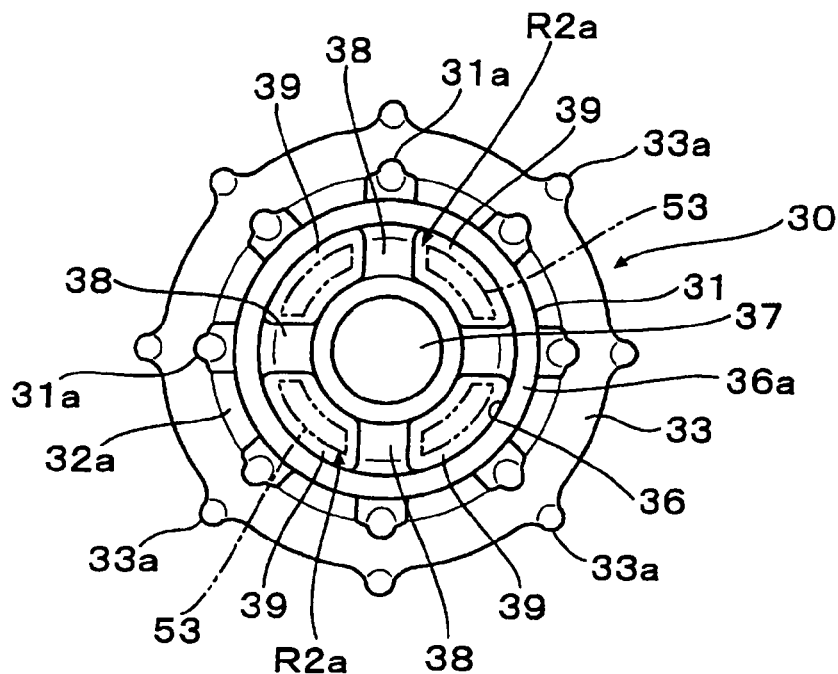
Figure 5B:
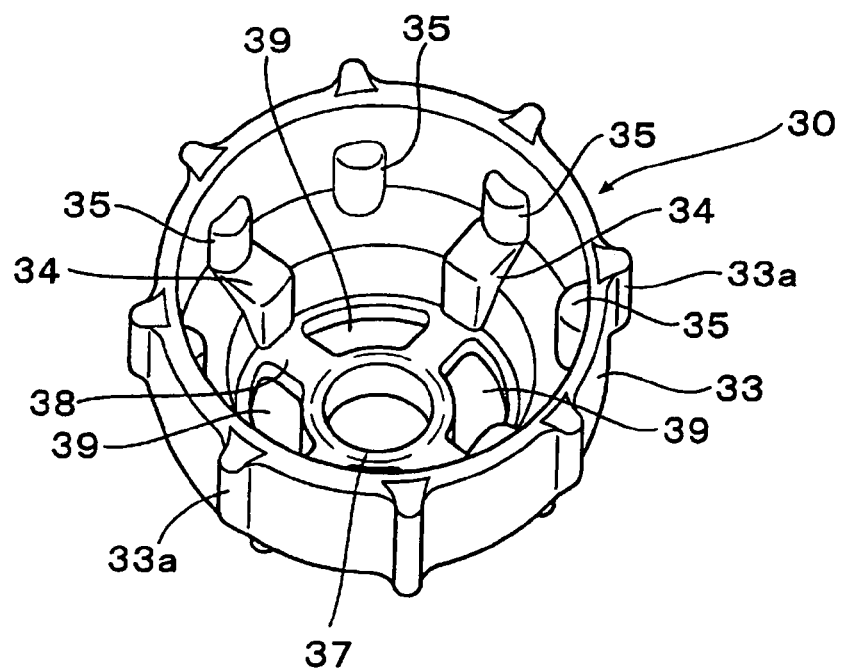

As shown in FIG. 5B, plural positive-pressure spring support portions 34 ("spring support portions" in the invention) project from an inner circumference of the small-diameter cylindrical portion 31 at uniform intervals in a circumferential direction and in positions which are offset relative to plural through holes 39. And, plural spring holding ribs 35 project from an inner circumference of the large-diameter cylindrical portion 33 at uniform intervals in the circumferential direction, and part of the plural spring holding ribs 35 are disposed in positions which are aligned with the positive-pressure spring support portions 34.

The positive-pressure spring S1 is inserted into the large-diameter cylindrical portion 33 at a distal end thereof so as to be supported by the positive-pressure spring support portions 34, and an outer circumference of the positive-pressure spring S1 is held by the spring holding ribs 35, whereby the positive-pressure spring S1 is held in a certain posture so as not to be inclined (refer to FIG. 3). The large-diameter cylindrical portion 33 is extended to have a length adequate to cover substantially the whole circumference of the positive-pressure spring S1 which is accommodated and supported within the positive-pressure valve 30 and to restrain fuel vapor from coming into contact with the positive-pressure spring S1 when the positive-pressure valve 30 is detached from the positive-pressure valve seat 15a and fuel vapor passes through the positive-pressure flow path R1.

In the check valve 1 of this embodiment, the positive-pressure spring S1 is disposed in the inner circumference of the positive-pressure valve 30, whereby an outer circumference of the positive-pressure valve S1 is covered by a circumferential wall (a circumferential wall of the large-diameter cylindrical portion 33) of the positive-pressure valve 30 and the positive-pressure flow path R1 is disposed on an outer side of the positive-pressure spring S1.

As shown in FIGS. 5A to 7, plural guide ribs 31a and plural guide ribs 33a are disposed radially at uniform intervals on outer circumferences of the small-diameter cylindrical portion 31 and the large-diameter cylindrical portion 33, respectively. These guide ribs extend along an axial direction so as to guide the positive-pressure valve 30 when the positive-pressure valve 30 slides within the valve chamber V. In addition, these guide ribs secures a gap between the small-diameter cylindrical portion 31 and the diametrically constricted inner circumferential portion 15 and between the large-diameter cylindrical portion 33 and the diametrically expanded inner circumferential portion 14, respectively, whereby flow paths to allow fuel vapor to flow therethrough are defined. Distal end portions of the guide ribs 31a, 33a each has a shape in which its height increases gradually as it extends towards the side of a proximal end thereof (refer to FIGS. 6, 7). As shown in FIG. 3, the outer circumference 32a of the connecting portion 32 to be attached to and detached from the positive-pressure valve seat 15a on the main-casing 10 is tapered to expand gradually as it extends towards the side of the large-diameter cylindrical portion 33.

In the positive-pressure valve 30, the small and large cylindrical portions 31, 33 are connected together concentrically in the order in which the outside diameter decreases, and the connecting portion 32 has a tapered shape. Further, distal end portions of the guide ribs 31a, 33a also have tapered shapes. Thus, the positive-pressure valve 30 has an outer circumferential shape with fewer steps from the distal end side to the proximal end side (refer to FIGS. 6, 7).

As shown in FIGS. 2, 3, a circumferential edge of an opening portion 36 at the distal end side of the small-diameter cylindrical portion 31 is made into a projecting shape which projects in an annular fashion, and this annular projection constitutes a negative-pressure valve seat 36a to and from which the negative-pressure valve 50 is attached and detached. And, as shown in FIGS. 3 and 5A, plural connecting pieces 38 project from an inner circumference of the opening portion 36 at uniform intervals towards a central position of the opening portion 36, and a cylindrical negative-pressure spring support portion 37, which is closed at an apex portion thereof, projects from the central position of the opening portion 36. As shown in FIG. 5A, a gap between the opening portion 36 and the negative-pressure spring support portion 37 is defined by the plural connecting pieces 38, whereby plural through holes 39 are formed which communicate with an interior of the positive-pressure valve 30.

A distal end of a negative-pressure spring S2 is inserted and supported on an inner circumference of the negative-pressure spring support portion 37 (refer to FIG. 3), and plural leg portions 53 of the negative pressure valve 50 are individually inserted into the plural through holes 39 (refer to FIG. 5A). The negative-pressure spring support portion 37 does not have to be cylindrical, and there is imposed no limitation on the configuration of the negative-pressure spring support portion 37. For example, a disk plate supported by connecting pieces may be disposed at the center of the opening portion 36 and a support projection may project from a rear surface side thereof.

The positive-pressure spring S1 is disposed between the positive-pressure valve 30 and the sub-casing 20. Namely, a proximal end of the positive-pressure spring S1 is supported by the bearing seats 24a on the outer circumferences of the spring support ribs 24 of the sub-casing 20, and a distal end thereof is supported by the positive-pressure spring support portions 34 on the inner circumference of the positive-pressure valve 30, whereby the positive-pressure spring S1 is held while being compressed between the positive-pressure valve 30 and the sub-casing 20, and the outer circumference 32a of the positive-pressure valve 30 is normally in abutment with the positive-pressure valve seat 15a (refer to FIG. 3). Consequently, when the pressure within the fuel tank increases to a certain value or higher, the positive-pressure valve 30 is pressed against by fuel vapor so as to slide in the valve chamber V, whereby the outer circumference 32a of the positive-pressure valve 30 is attached to and detached from the positive-pressure valve seat 15a.

The negative-pressure valve 50, which is adapted to be attached to and detached from the negative-pressure valve seat 36a so as to close and open the through holes 39, is disposed slidably relative to the positive-pressure valve 30 on an outer side of the distal end of the positive-pressure valve 30.

Figure 6:
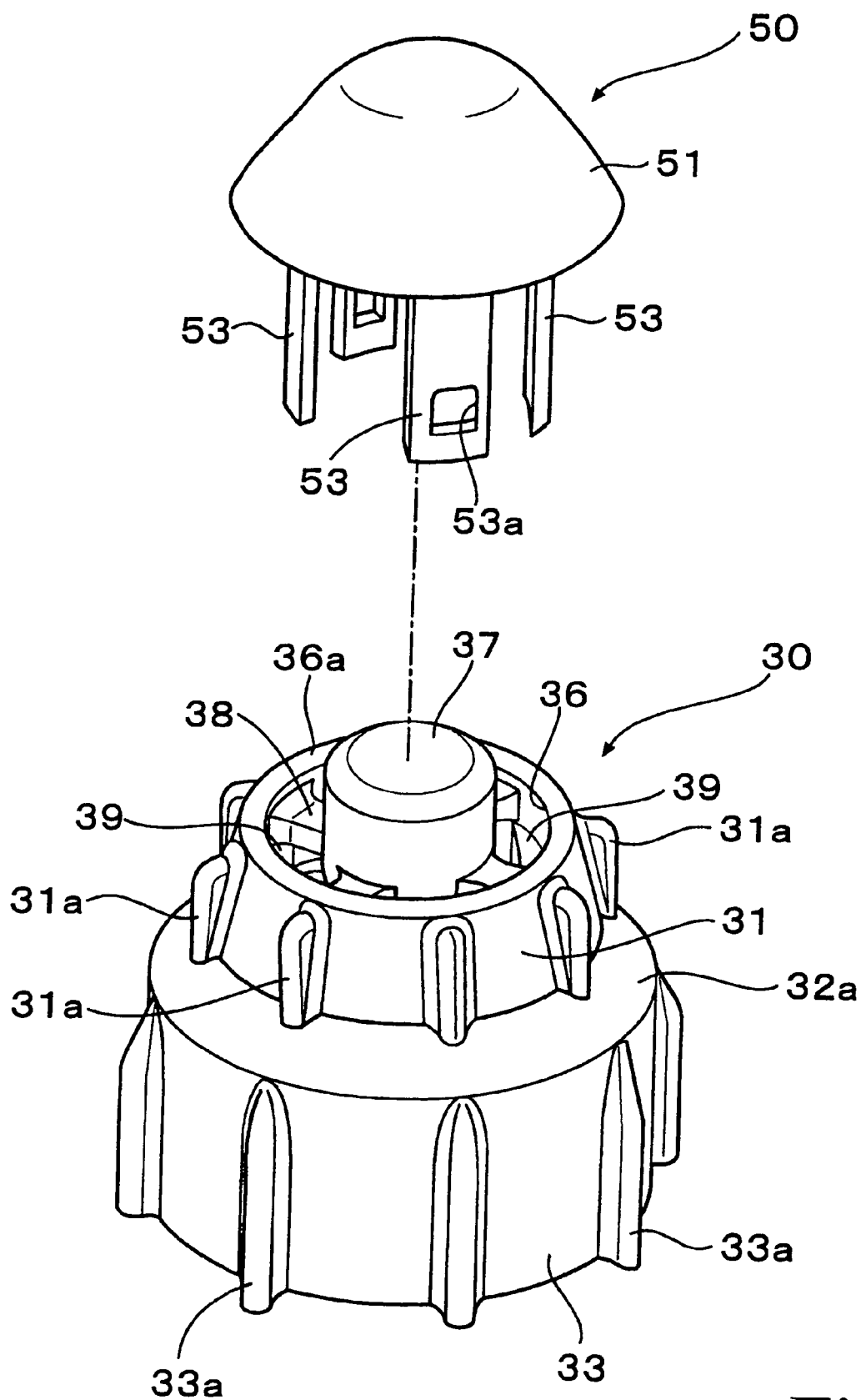
FIG. 6 is a perspective view showing a first assembling step of the check valve.

As shown in FIG. 6, the negative-pressure valve 50 has a head portion 51 which is rounded at an apex portion at a distal end thereof and is expanded obliquely outwards into an umbrella shape. A circumferential edge portion 51a on a rear surface of the head portion 51 to be attached to and detached from the negative-pressure valve seat 36a has a size substantially matching the negative-pressure valve seat 36a of the positive-pressure valve 30. When the negative-pressure valve is assembled to the positive-pressure valve 30, the negative-pressure spring support portion 37 which supports at one end of the negative-pressure spring S2 is disposed inside the head portion 51 (refer to FIG. 3).

Figure 7:
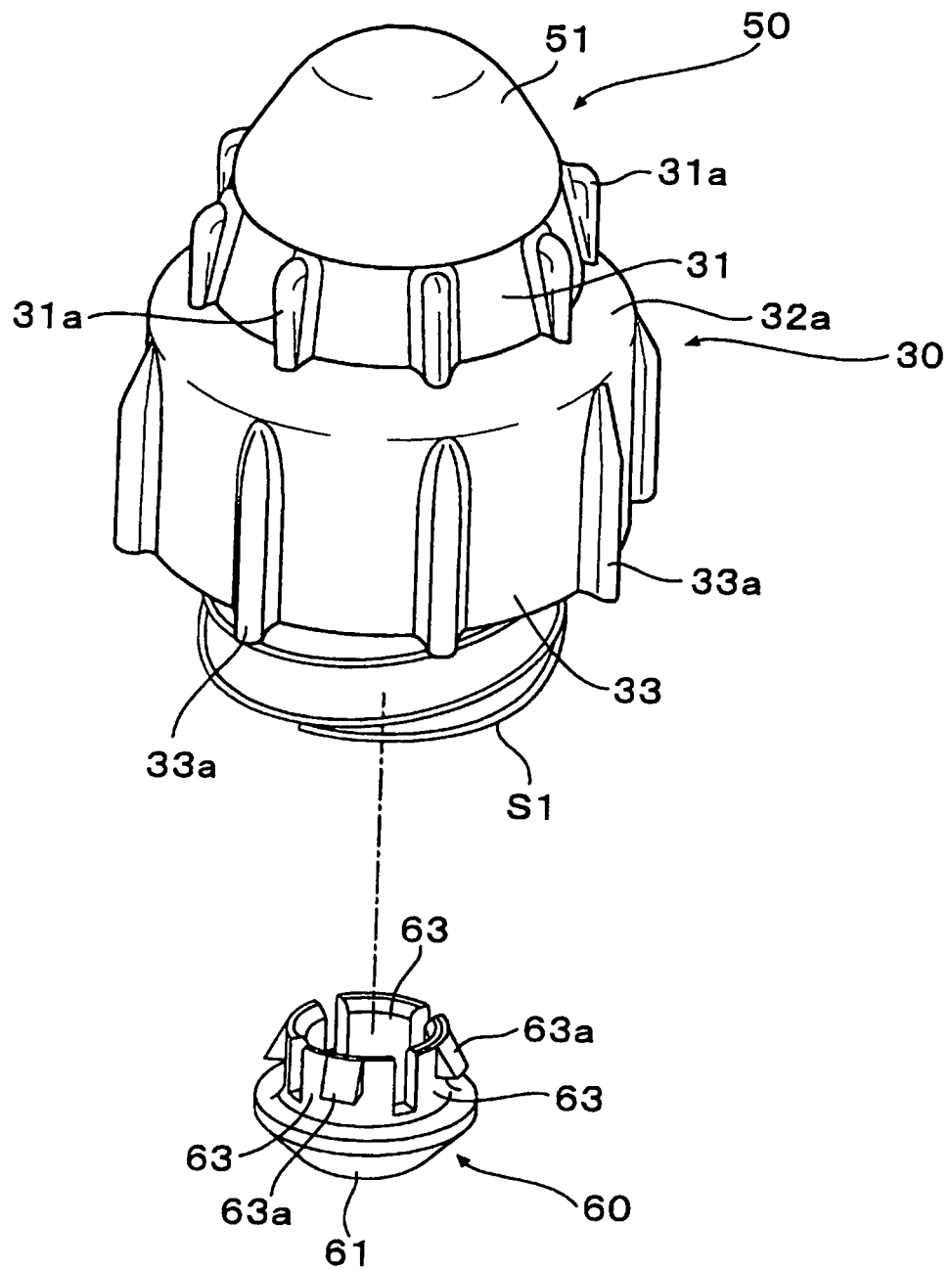
FIG. 7 is a perspective view showing a second assembling step of the check valve.

FIG. 7 shows a state in which the negative-pressure valve 50 having the head portion 51 as described above is assembled to the outer side of the distal end of the positive-pressure valve 30 having the outer circumferential shape having fewer steps from the distal end side towards the proximal end side. As shown in FIG. 7, when the two valves are assembled together, a shape is formed which has fewer steps and expands in a step-like fashion from the distal end of the negative-pressure valve 50 to the side of the proximal end of the positive-pressure valve 30. Namely, the outer circumferential shape of the positive-pressure valve 30 and the outer circumferential shape of the negative-pressure valve 50 which is disposed on the outer side of the distal end of the positive-pressure valve 30 are combined to form a so-called streamlined shape along which fuel vapor flows smoothly, suppressing the generation of an eddying flow when fuel vapor flows out from the fuel tank (from the main-casing 10 towards the sub-casing 20).

Figure 10:
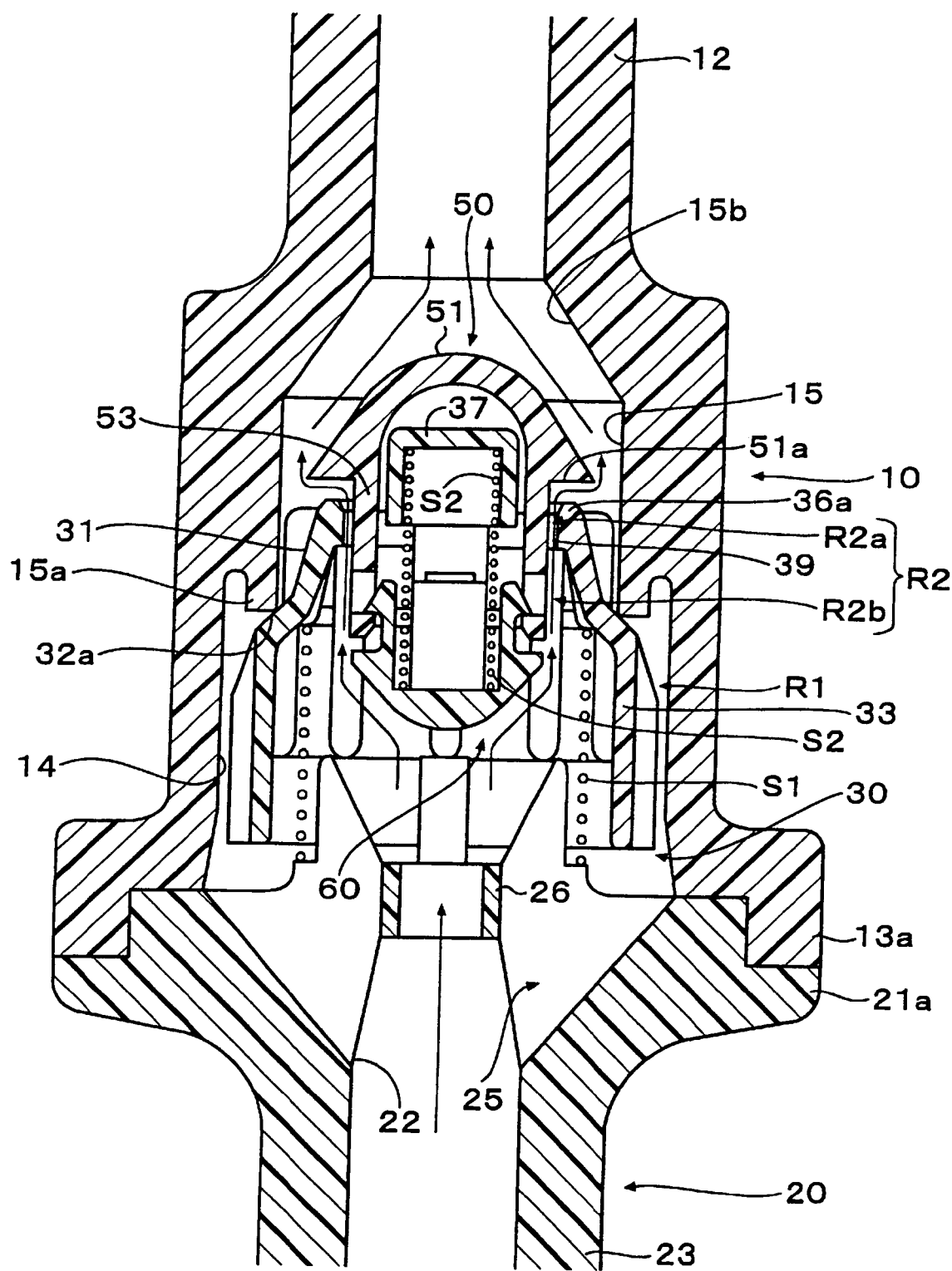
FIG. 10 is an enlarged sectional view of the main part of the check valve showing a state in which the pressure within the fuel tank decreases to a certain value or lower than the atmospheric pressure.

The leg portions 53 extend from a rear surface side of the head portion 51 at uniform intervals in a circumferential direction to thereby be inserted into the positive-pressure valve 30 through the through holes 39. When the negative-pressure valve 50 is assembled to the positive-pressure valve 30, the leg portions 53 are disposed further outwards than the negative-pressure spring support portion 37 of the positive-pressure valve 30 (refer to FIG. 3). In addition, as shown in FIGS. 3, 5A and 10, an in-through-hole flow path R2a is formed between the through holes 39 in the positive-pressure valve 30 and the leg portions 53 which are inserted into the through holes 39, and this in-through-hole flow path R2a constitutes part of a negative-pressure flow path R2 which allows outside air to flow into the fuel tank when the negative-pressure valve 50 is detached from the negative-pressure valve seat 36a. Further, engagement holes 53a are formed individually in distal end portions of the leg portions 53.

A cap 60 is disposed in the interior of the positive-pressure valve 30, and this cap 60 is connected to the leg portions 53 of the negative-pressure valve 50 via a locking unit and holds the negative-pressure valve 50 so as to slide relative to the positive-pressure valve 30.

This cap 60 has a bottomed cylindrical shape in whole. The cap 60 has a spring holding portion 61 in which a spring accommodation recess portion 61a (refer to FIG. 3) having a certain depth is provided in the center thereof, and plural leg portion support pieces 63 (refer to FIG. 7) erected from a circumferential edge of the spring accommodation recess portion 61a at certain intervals in a circumferential direction. In addition, the spring accommodation recess portion 61a and the negative-pressure spring support portion 37 of the positive-pressure valve 30 are disposed in positions which face each other coaxially when the negative-pressure valve 50 is held slidably on the positive-pressure valve 30 via the cap 60. Engagement projections 63a project from outer circumferences of distal ends of the leg portion support pieces 63 so as to be brought into engagement with the engagement holes 53a in the negative-pressure valve 50. These engagement projections 63a and the engagement holes 53a constitute a "locking unit" in the invention. As the locking unit, engagement projections are provided on the leg portions 53, while engagement holes may be provided in the cap 60. Thus, there is no limitation on the locking unit as long as the negative-pressure valve 50 and the cap can be connected together via any locking unit.

In addition, as shown in FIGS. 3 and 10, an in-valve flow path R2b is formed between an inner circumference of the large-diameter cylindrical portion 33 and an inner circumference of the small-diameter cylindrical portion of the positive-pressure valve 30 and the leg portions 53 of the negative-pressure valve 50 and an outer circumference of the cap 60, and this in-valve flow path R2b constitutes part of the negative-pressure flow path R2 which allows outside air to flow into the fuel tank when the negative-pressure valve is detached from the negative-pressure valve seat 36a. This in-valve flow path R2b communicates with the in-through-hole flow path R2a, and the negative-pressure flow path R2 is made up of both the flow paths R2a, R2b.

In addition, in the check valve 1 of this embodiment, the negative-pressure spring S2 is disposed in the inner circumference of the negative-pressure valve 50 at one end and is disposed in the inner circumference of the cap 60 at the other end thereof, whereby an outer circumference of the negative-pressure spring S2 is partially covered by a circumferential wall (the leg portions 53) of the negative-pressure valve 50 and a circumferential wall (the leg portion support pieces 63) of the cap 60, and the negative-pressure flow path R2 which is made up of the in-through-hole flow path R2a and the in-valve flow path R2b is disposed on an outer side of the negative-pressure spring S2.

Figure 8:
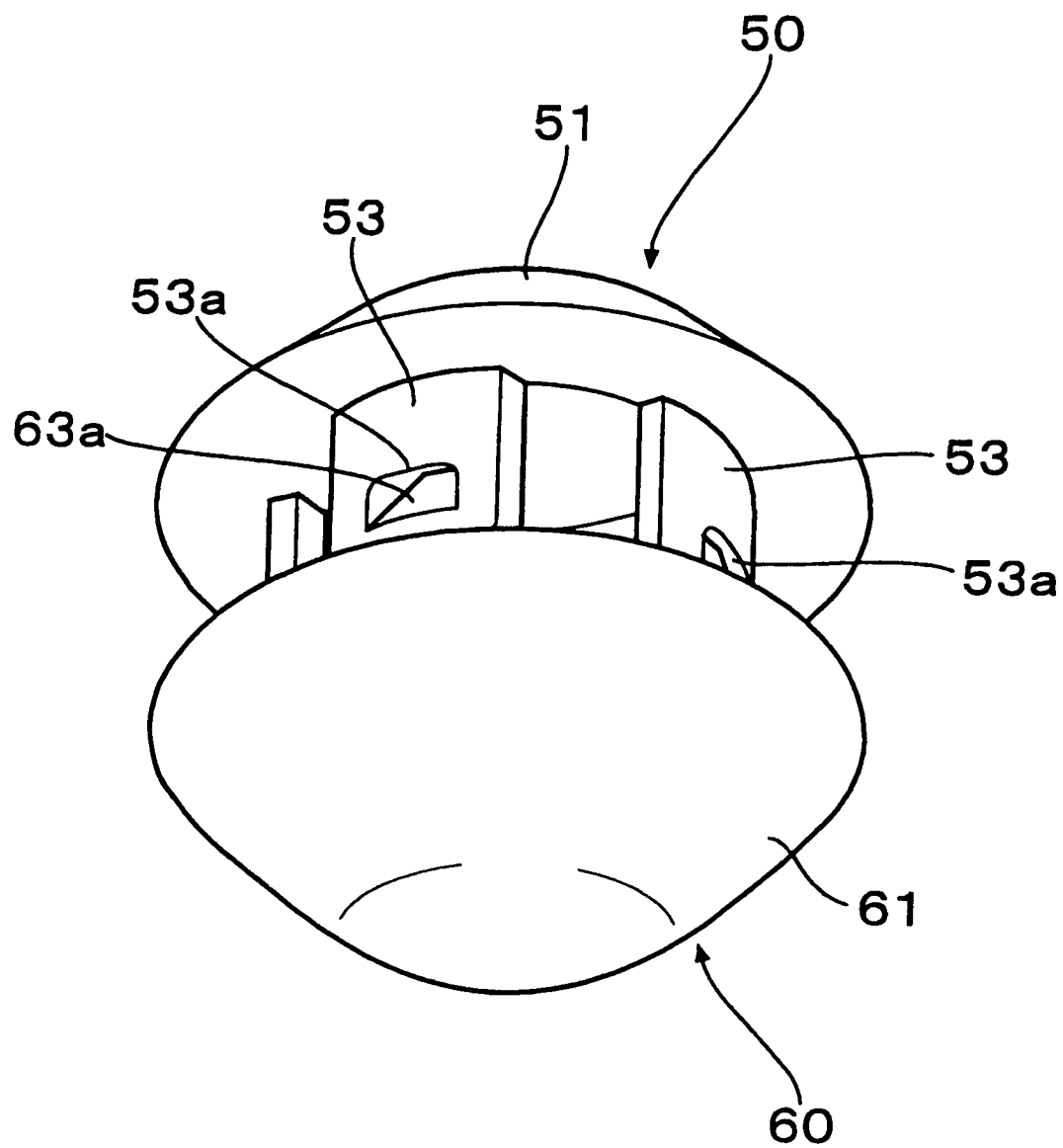
FIG. 8 is a perspective view showing a state in which a negative-pressure valve and a cap are assembled together in the check valve, as seen from obliquely therebelow.

In addition, the outer circumference of the spring holding portion 61 is formed into a curved surface with a bottom portion thereof rounded which expands gradually diametrically as it extends towards a distal end side thereof. Because of this, as shown in FIG. 8, when the cap 60 is assembled to the rear surface side of the negative-pressure valve 50 by bringing the engagement projections 63a of the cap 60 into engagement with the engagement holes 53a in the negative-pressure valve 50, the outer circumference of the cap 60 is formed into a projecting surface which projects towards the side of the sub-casing 20. To facilitate the understanding of an assembled state between the negative-pressure valve 50 and the cap 60, in FIG. 8, the positive-pressure valve 30 is omitted.

The negative-pressure spring S2 is disposed between the positive-pressure valve 30 and the cap 60. Namely, the negative-pressure spring S2 is supported by the spring accommodation recess portion 61a of the cap 60 at a proximal end and is supported on an inner circumference of the negative-pressure spring support portion 37 of the positive-pressure valve 30 at a distal end, whereby the negative-pressure spring S2 is held while being compressed between the positive-pressure valve 30 and the cap 60, and the negative-pressure valve is biased towards the positive-pressure valve 30, the circumferential edge portion 51a on the rear surface of the negative-pressure valve 50 being normally in abutment with the negative-pressure valve seat 36a of the positive-pressure valve 30. Consequently, the circumferential edge portion 51a on the rear surface side of the negative-pressure valve 50 is attached to or detached from the negative-pressure valve seat 36a such that, when the pressure within the fuel tank decreases to a certain value or lower than the atmospheric pressure, the negative-pressure valve 50 is pressed against by outside air and then slides relative to the positive-pressure valve 30.

Next, a fabrication process of the above-described check valve 1 will be described. As shown in FIG. 6, the plural leg portions 53 of the negative-pressure valve 50 are aligned with the plural through holes 39 in the positive-pressure valve 30 and then, the plural leg portions 53 are inserted into the interior of the positive-pressure valve 30 through the plural through holes 39. Thereafter, as shown in FIGS. 3 and 7, the distal end of the negative-pressure spring S2 is inserted into the negative-pressure spring support portion 37 of the positive-pressure valve 30 to be supported therein, and the cap 60 is inserted into the interior of the positive-pressure valve 30, so that the proximal end of the negative-pressure spring S2 is inserted in the spring accommodation portion 61a of the cap to be supported therein. Then, the cap 60 is pushed towards the side of the negative-pressure valve 50 while compressing the negative-pressure spring S2 against the biasing force thereof so that the engagement projections 63a on the cap 60 are brought into engagement with the engagement holes 53a in the negative-pressure valve 50, whereby as shown in FIGS. 2, 3, the negative-pressure valve 50 can be assembled slidably to the positive-pressure valve 30.

In the check valve 1, the negative-pressure vale 50 can be held slidably relative to the positive-pressure valve 30 by simply connecting the leg portions 53 of the negative-pressure valve 50 to the cap via the locking unit. Thus, the step of welding the second valve after the negative-pressure valve is accommodated within the first valve body does not have to be involved, unlike to Patent Document 1, thereby simplifying the assemblage process and reducing fabrication cost.

After the two valves are assembled together into the integral unit as described above, a negative-pressure valve 50 residing side of the integral unit is disposed to be accommodated within the diametrically constricted inner circumferential portion 15 of the main-casing 10, and an opposite side thereof is disposed to be accommodated within the diametrically expanded inner circumferential portion 14 of the main-casing 10. Then, the distal end of the positive-pressure spring S1 is inserted into the inner circumferential surface of the positive-pressure valve 30 so as to be brought into abutment with the positive-pressure spring support portions 34 for support, while the proximal end of the positive-pressure spring S1 is supported by the bearing seats on the outer circumferences of the spring support ribs 24 of the sub-casing 20. Thereafter, the sub-casing 20 is forcibly pushed towards the opening portion as the other end of the main-casing 10 against the biasing force of the positive-pressure sprig S1, so that both the flange portions 13, 21a are abutted against each other, and the lid portion 21 of the sub-casing 20 is fitted in the inner circumference of the fitting wall 13a of the main-casing 10. Then, the resulting abutment portion is welded by ultrasonic welding, whereby the sub-casing 20 can be assembled to the main-casing 10. Bonding using an adhesive may be adopted in place of welding.

Next, the function and advantage of the above-described check valve 1 will be described by reference to FIGS. 2, 3 and 9, 10.

This check valve 1 is installed in the fuel tank through the following steps: the pipe installed within the fuel tank and connected with a cut valve is connected to the connection pipe 12 of the main-casing 10; the pipe connected to the canister or the like which is installed outside the fuel tank is connected to the connection pipe 23 of the sub-casing; and the clip 18 attached to the outer circumference of the main-casing 10 is brought into engagement with a mounting hole in a metal bracket secured to the interior of the fuel tank. The mounting form of the check valve 1 is not limited to the above described manner, and for example, the check valve 1 may be installed outside the fuel tank.

Then, when the pressure inside the fuel tank is a certain pressure or lower, as shown in FIG. 3, the positive-pressure valve 30 is pressed against the positive-pressure valve seat 15a by the biasing force of the positive-pressure spring S1, and the opening in the diametrically constricted inner circumferential portion 15 of the main-casing 10 which communicates with the interior of the fuel tank is closed thereby. In this state, the cap 60 is pushed towards the side of the sub-casing 20 by the biasing force of the negative-pressure spring S2. Thus, the negative-pressure valve 50 which is connected integrally to the cap 60 is pressed against towards the side of the positive-pressure valve 30, and the circumferential edge portion 51a on the rear surface side of the negative-pressure valve 50 is brought into abutment with the negative-pressure valve seat 36a of the positive-pressure valve 30, whereby the through holes 39 and the in-through-hole flow path R2a are closed.

Figure 9:
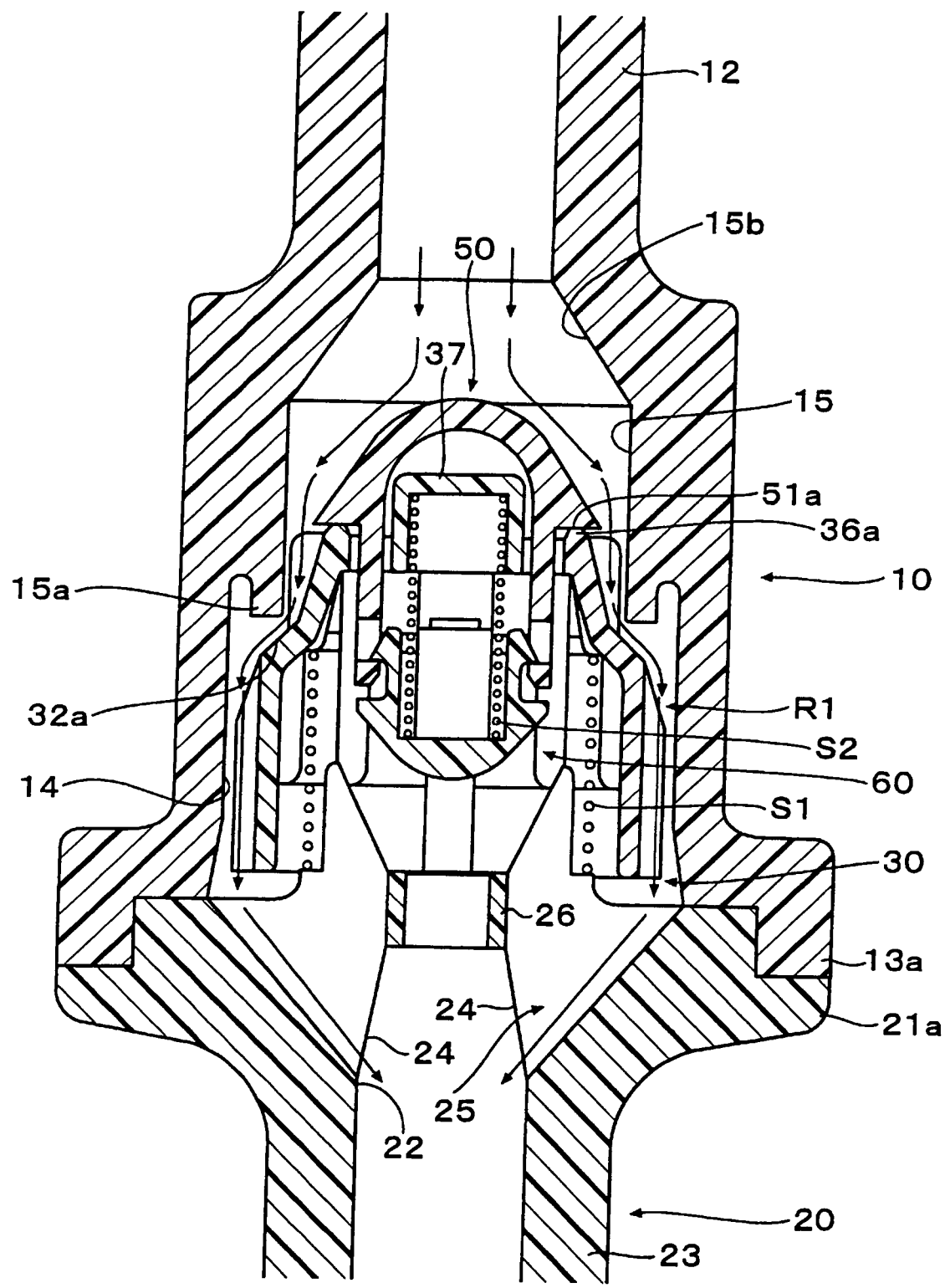
FIG. 9 is an enlarged sectional view of the main part of the check valve showing a state in which a pressure within a fuel tank reaches a certain value or higher.

In the above-described state, when the pressure within the fuel tank increases to a certain value or higher, the positive-pressure valve 30 is pushed by the pressure of fuel vapor introduced via the connection pipe 12 of the main-casing 10, and as shown in FIG. 9, the positive-pressure valve 30 slides towards the side of the sub-casing 20 against the biasing force of the positive-pressure spring S1, whereby the outer circumference 32a of the positive-pressure valve 30 is detached from the positive-pressure valve seat 15a. As a result, as indicated by arrows in the same figure, fuel vapor flows through the positive-pressure flow path R1, passes through the intervals 25 between the spring support ribs 24 of the sub-casing 20, enter the opening portion 22, is sent to the not-shown canister via the connection pipe 23 and a not-shown pipe, and eventually flows out from the fuel tank. Through the above actions, the pressure in the fuel tank is restrained from increasing to the certain value or higher.

On the other hand, when the pressure within the fuel tank decreases to a certain value or lower than the atmospheric pressure, outside air is introduced into the valve chamber V through the ring 26 (refer to FIG. 2) via the connection pipe 23 of the sub-casing 20. Then, the negative-pressure valve 50 is pressed via the cap 60 by the outside air so introduced, and as shown in FIG. 10, the negative-pressure valve 50 slides towards the side of the main-casing 10 which faces the connection pipe 12 against the biasing force of the negative-pressure spring S2, whereby the circumferential portion 51a on the rear surface side of the negative-pressure valve 50 is detached from the negative-pressure valve seat 36a of the positive-pressure valve 30. As a result, as indicated by arrows in the same figure, the outside air flows through the negative-pressure flow path R2 (the in-valve flow path R2b and the in-through-hole flow path R2a), enters the interior of the diametrically constricted inner circumferential portion 15 and flows into the fuel tank via the connection pipe 12 and a not-shown pipe. Through the above actions, the pressure within the fuel tank is restrained from decreasing to the certain value or lower.

In this check valve 1, the positive-pressure flow path R1 is formed so as to pass by the outer side of the positive-pressure spring S1, and the negative-pressure flow path R2 is also formed so as to pass by the outer side of the negative-pressure spring S2. Therefore, fuel vapor and outside air flow so as to avoid the positive-pressure spring S1 and the negative-pressure spring S2, respectively. As a result, the vibrations or oscillations of the positive-pressure spring S1 and the negative-pressure spring S2 and the positive-pressure valve 30 and the negative-pressure valve 50 which are biased by the positive-pressure and negative-pressure valves, respectively, can be restrained, thereby reducing the operation noise of the positive-pressure valve 30 and the negative-pressure valve 50 which is generated when they slide.

In the check valve 1, the through holes 39 formed in the positive-pressure valve 30 are opened and closed by the negative-pressure valve 50. Normally, the negative-pressure valve 50 is biased towards the negative-pressure vale seat 36a by the negative-pressure spring S2 so as to close the through holes 39 (refer to FIG. 3). And, when the positive-pressure state is present in which the pressure within the fuel tank increases to the certain value or higher, the through holes 39 are also kept closed (refer to FIG. 9). Consequently, as shown in FIG. 9, when fuel vapor flows out from the fuel tank through the positive-pressure flow path R2, the flowing fuel vapor can be prevented from being disturbed in the inner circumference of the through holes 39 so that an eddying flow is not generated. Thus, the vibration of the positive-pressure valve 30 is restrained, thereby reducing abnormal noise.

Next, the function and advantage of the embodiment will be described.

In this embodiment, the plural spring support ribs 24 project from the circumferential edge of the opening portion 22 which is formed within the sub-casing 20 so as to communicate with the outside of the fuel tank towards the positive-pressure valve 30, the bearing seats 24a which support the one end of the positive-pressure spring S1 are formed on the outer circumferences of the spring support ribs 24, and the intervals 25 between the spring support ribs 24 communicate with the positive-pressure flow path R1, whereby the flow path allows fuel vapor to flow out from the fuel tank.

Since the one end (the proximal end) of the positive-pressure spring S1 is supported by the bearing seats 24a on the outer circumferences of the spring support ribs 24, the positive-pressure spring S1 can be supported with the stable posture. Further, since the intervals 25 between the plural spring support ribs 24 are configured into the flow path which communicates with the positive-pressure flow path R1, the positive-pressure spring S1 is prevented from disturbing the flow of fuel vapor so that fuel vapor smoothly flows into the opening portion 22 and to be released from the fuel tank.

Further, the flow paths provided in the intervals 25 between the plural spring support ribs 24, specifically speaking, the inner circumferential surface of the opening portion 22 which configures the flow path is made into the tapered surface which expands gradually diametrically towards the side of the valve chamber V.

The inner circumferential surface of the opening portion which configures the flow path communicating with the positive-pressure flow path R1 is made into the tapered surface which expands gradually diametrically towards the side of the valve chamber V. Therefore, the flow resistance can be reduced which is generated when the positive-pressure valve seat 15a is opened and fuel vapor passes through the positive-pressure flow path R1 to thereby flow out from the fuel tank. As a result, fuel vapor smoothly flows out from the fuel tank, thereby restraining the vibration of the positive-pressure valve 30 effectively. In addition, the inner circumferential surface of the opening portion 22 is made into the tapered surface, whereby as indicated by arrows in FIG. 2, fuel vapor flowing in from an outer circumferential edge of the opening portion 22 can be introduced into the opening portion 22 along the tapered surface with almost all of the fuel vapor being prevented from touching the positive-pressure spring S1. Therefore, the vibration of the positive-pressure spring S1 can be prevented in an ensured fashion.

Still further, as shown in FIG. 7, the outer circumferential shape of the positive-pressure valve 30 and the outer circumferential shape of the negative-pressure valve 50 disposed on the outer side of the distal end of the positive-pressure valve 30 are combined together to form the streamlined shape from the main-casing 10 towards the side of the sub-casing 20.

The positive-pressure valve 30 and the negative-pressure valve 50 are combined to form the streamlined shape. Therefore, when the positive-pressure valve 30 is pushed to open the positive-pressure valve seat 15a, allowing fuel vapor to flow through the positive-pressure flow path R1, fuel vapor smoothly flows along the outer circumference of the negative-pressure valve 50 and the outer circumference of the positive-pressure valve 30 without generating an eddying flow or turbulent conditions (refer to FIG. 9), whereby the fuel vapor flows with the reduced flow resistance, thereby restraining the vibration of the positive-pressure valve 30 or the looseness of the negative-pressure valve 50 disposed on the outer side of the distal end of the positive-pressure valve 30. Further, the valve can be made small in size in whole, thereby reducing the weight of the valve and enabling the positive-pressure valve 30 and the negative-pressure valve 50 to slide smoothly.

Still further, as shown in FIG. 8, the outer circumference of the cap 60 is formed into the projecting surface which projects towards the side of the sub-casing 20. Because of this, when the circumferential edge portion 51a on the rear surface side of the negative-pressure valve 50 is detached from the negative-pressure valve seat 36a and outside air flows through the negative-pressure flow path R2, the flow resistance of the outside air can be reduced, enabling the outside air to flow through the negative-pressure flow path R2 smoothly (refer to arrows in FIG. 10). Particularly, the vibration of the negative-pressure valve 50 can be restrained effectively.

Still further, the positive-pressure spring support portions 34 are formed on the inner circumference of the large-diameter cylindrical portion 33 of the positive-pressure valve 30, and the positive-pressure spring S1 is supported by the positive-pressure spring support portions 34 at the one end (the distal end side) thereof and is disposed in the inner circumference of the positive-pressure valve 30.

The one end of the positive-pressure spring S1 is supported by the positive-pressure spring support portions 34 on the inner circumference of the positive-pressure valve 30 and is disposed in the inner circumference of the positive-pressure valve 30. Therefore, when fuel vapor passes through the positive-pressure flow path R1, fuel vapor can be prevented from flowing across the positive-pressure spring S1 to bypass the same spring in an ensured fashion (refer to FIG. 9). In addition, the one end of the positive-pressure spring S1 pressing the positive-pressure spring S1 is positioned close to the center of gravity G of the positive-pressure valve 30 (refer to FIG. 3) and is positioned close to the positive-pressure vale seat 15a. Therefore, the positive-pressure valve 30 can be opened with the stable posture, thereby reducing the operation noise of the positive-pressure valve 30 generated when it slides.

Still further, the cap 60 has the bottomed cylindrical shape in whole, and the one end (the proximal end) of the negative-pressure spring S2 is inserted into the spring accommodation recess portion 61a of the spring holding portion 60 and is supported on a bottom surface thereof. The one end of the negative-pressure spring S1 is inserted into the spring accommodation recess portion 61a of the cap 60 and is supported therein. Thus, almost the full circumference of a lower half portion of the negative-pressure spring S2 is covered as shown in FIG. 10. Therefore, when outside air passes through the negative-pressure flow path R2, the outside air can be prevented from passing across the negative-pressure spring S2 to bypass the negative-pressure spring S2 in an ensured fashion.

Still further, the inner circumferential surface of the diametrically constricted circumferential portion 15 of the main-casing 10 which lies closer to the side of the fuel tank than the positive-pressure valve seat 15a is made into the tapered surface 15b which expands gradually diametrically as it extends towards the opening portion at the side which faces the side of the sub-casing 20 (refer to FIGS. 9, 10). Because of this, the flow resistance can be reduced which is generated when the positive-pressure valve 30 is opened and fuel vapor flows out from the fuel tank and when the negative-pressure valve 50 is opened and outside air flows into the fuel tank, thereby allowing fuel vapor and outside air to flow smoothly.

Still further, in the main-casing 10, the annular rib-shaped positive-pressure valve seat 15a projects from the circumferential edge of the diametrically constricted circumferential portion 15 at the side of the sub-casing 20 via the gap 16 from the diametrically expanded inner circumferential portion 14. Thus, the positive-pressure valve seat 15a can be made constant in thickness while being prevented from being made thicker locally. Therefore, a defect such as a surface sink can be prevented from being generated during injection molding, thereby increasing the surface accuracy of a seal surface of the positive-pressure valve seat 15a with respect to the outer circumference 32a of the positive-pressure valve 30, thereby increasing the sealing performance.

The invention claimed is:

1. A check valve connected to a pipe communicating with an interior of a fuel tank, the check valve including a main-casing having a positive-pressure valve seat formed in an interior thereof, a sub-casing assembled to the main-casing so as to form a valve chamber and communicating with an outside of the fuel tank, and a positive-pressure valve and a negative-pressure valve disposed slidably in the valve chamber, wherein the positive-pressure valve is formed into a cylindrical shape, a plurality of through holes communicating with an interior thereof and a negative-pressure valve seat to and from which the negative-pressure valve is attached and detached are formed on a distal end side of the positive-pressure valve, and an outer circumference of the positive-pressure valve is attached to and detached from the positive-pressure valve seat, wherein the negative-pressure valve is disposed on an outer side of a distal end of the positive-pressure valve so as to be attached to and detached from the negative-pressure valve seat to thereby close and open the through holes and has a plurality of leg portions which are inserted into the interior of the positive-pressure valve through the through holes, wherein a cap, which is connected to the plurality of leg portions of the negative valve via a locking unit and which holds the negative-pressure valve slidable with respect to the positive-pressure valve, is disposed in the interior of the positive-pressure valve, wherein a positive-pressure valve spring, which biases the positive-pressure valve towards the positive-pressure valve seat in the main-casing, is disposed between the positive-pressure valve and the sub-casing, wherein a negative-pressure valve spring, which biases the negative-pressure valve towards the negative-pressure valve seat in the positive-pressure valve, is disposed between the positive-pressure valve and the cap, wherein the positive-pressure valve is detached from the positive-pressure valve seat when a pressure within the fuel tank is equal to or larger than a certain value, and the negative-pressure valve is detached from the negative-pressure valve seat when the pressure within the fuel tank decreases to a certain value or lower than the atmospheric pressure, wherein a positive-pressure flow path for allowing fuel vapor to flow out from the fuel tank when the positive-pressure valve is detached from the positive-pressure valve seat is formed so as to pass by an outer side of the positive-pressure spring between the outer circumference of the positive-pressure valve and an inner circumference of the main-casing, and wherein a negative-pressure flow path for allowing outside air to flow into the fuel tank when the negative-pressure valve is detached from the negative-pressure valve seat is formed so as to pass by an outer side of the negative-pressure spring between an inner circumference of the positive-pressure valve, and the leg portions and an outer circumference of the cap and between the through holes and the leg portions.

2. The check valve of claim 1,
   wherein an opening portion communicating with the outside of the fuel tank is formed in an interior of the sub-casing,
   wherein a plurality of spring support ribs are provided so as to extend from a circumferential edge of the opening portion, outer circumferences of the spring support ribs constituting bearing seats for supporting one end of the positive-pressure spring, and
   wherein intervals between the spring support ribs communicate with the positive-pressure flow path to constitute flow paths which allow fuel vapor to flow out from the fuel tank.

3. The check valve of claim 2,
   wherein outer circumferences of the flow paths provided in the intervals between the spring support ribs each have a tapered surface which expands gradually diametrically as it extends towards the valve chamber.

4. The check valve of claim 1,
   wherein an outer circumferential shape of the positive-pressure valve and an outer circumferential shape of the negative-pressure valve which is disposed on the outer side of the distal end of the positive-pressure valve have a streamlined shape which extends from the main-casing towards the sub-casing.

5. The check valve of claim 1,
   wherein an outer circumference of the cap has a projecting surface which projects towards the sub-casing.

6. The check valve of claim 1,
   wherein a spring support portion is formed on an inner circumference of the positive-pressure valve, and
   wherein the positive-pressure spring is disposed in an inner circumference of the positive-pressure valve with the one end of the positive-pressure spring supported by the spring support portion.

7. The check valve of claim 1, wherein the cap has a bottomed cylindrical shape, and
   wherein one end of the negative-pressure valve is inserted into an interior thereof so as to be supported on a bottom surface of the cap.

8. The check valve of claim 1,
   wherein an inner circumferential surface of the main-casing which lies closer to a fuel tank side than the positive-pressure valve seat has a tapered surface which expands gradually diametrically as it extends towards an opening portion on a side facing the sub-casing.

9. The check valve of claim 1,
   wherein the positive-pressure valve seat of the main-casing comprises an annular rib which projects towards the sub-casing via a gap from an inner circumference of the main-casing.

* * * * *